(12) United States Patent
Friedman et al.

(10) Patent No.: US 6,407,535 B1
(45) Date of Patent: Jun. 18, 2002

(54) SYSTEM FOR BEAMING POWER FROM EARTH TO A HIGH ALTITUDE PLATFORM

(75) Inventors: Herbert W. Friedman, Oakland; Terry J. Porter, Ridgecrest, both of CA (US)

(73) Assignee: The Regents of the University of California, Oakland, CA (US)

( * ) Notice: Subject to any disclaimer, the term of this patent is extended or adjusted under 35 U.S.C. 154(b) by 20 days.

(21) Appl. No.: 09/657,416

(22) Filed: Sep. 8, 2000

(51) Int. Cl.[7] .................................................. B64G 1/10
(52) U.S. Cl. ...................................... 322/2 R; 244/1 R
(58) Field of Search ...................... 322/2 R, 40, 100, 322/2 A; 310/4; 290/1 R; 244/1 R

(56) References Cited

U.S. PATENT DOCUMENTS

| | | | | |
|---|---|---|---|---|
| 3,781,647 A | | 12/1973 | Glaser | 322/2 |
| 3,933,323 A | * | 1/1976 | Dudley et al. | 244/1 R |
| 4,078,747 A | * | 3/1978 | Minovitch | 244/159 |
| 4,305,555 A | * | 12/1981 | Davis | 244/158 R |
| 4,368,415 A | * | 1/1983 | Henderson et al. | 322/2 R |
| 5,223,781 A | * | 6/1993 | Criswell et al. | 322/2 R |
| 5,260,639 A | | 11/1993 | De Young et al. | 322/2 |
| 5,982,139 A | * | 11/1999 | Parise | 320/109 |

FOREIGN PATENT DOCUMENTS

WO    WO 98/13909    4/1998

* cited by examiner

*Primary Examiner*—Nicholas Ponomarenko
(74) *Attorney, Agent, or Firm*—Eddie E. Scott; Alan H. Thompson

(57) ABSTRACT

Power is transmitted to a high altitude platform by an array of diode pumped solid state lasers each operated at a single range of laser wavelengths outside of infrared and without using adaptive optics. Each laser produces a beam with a desired arrival spot size. An aircraft avoidance system uses a radar system for automatic control of the shutters of the lasers.

16 Claims, 16 Drawing Sheets

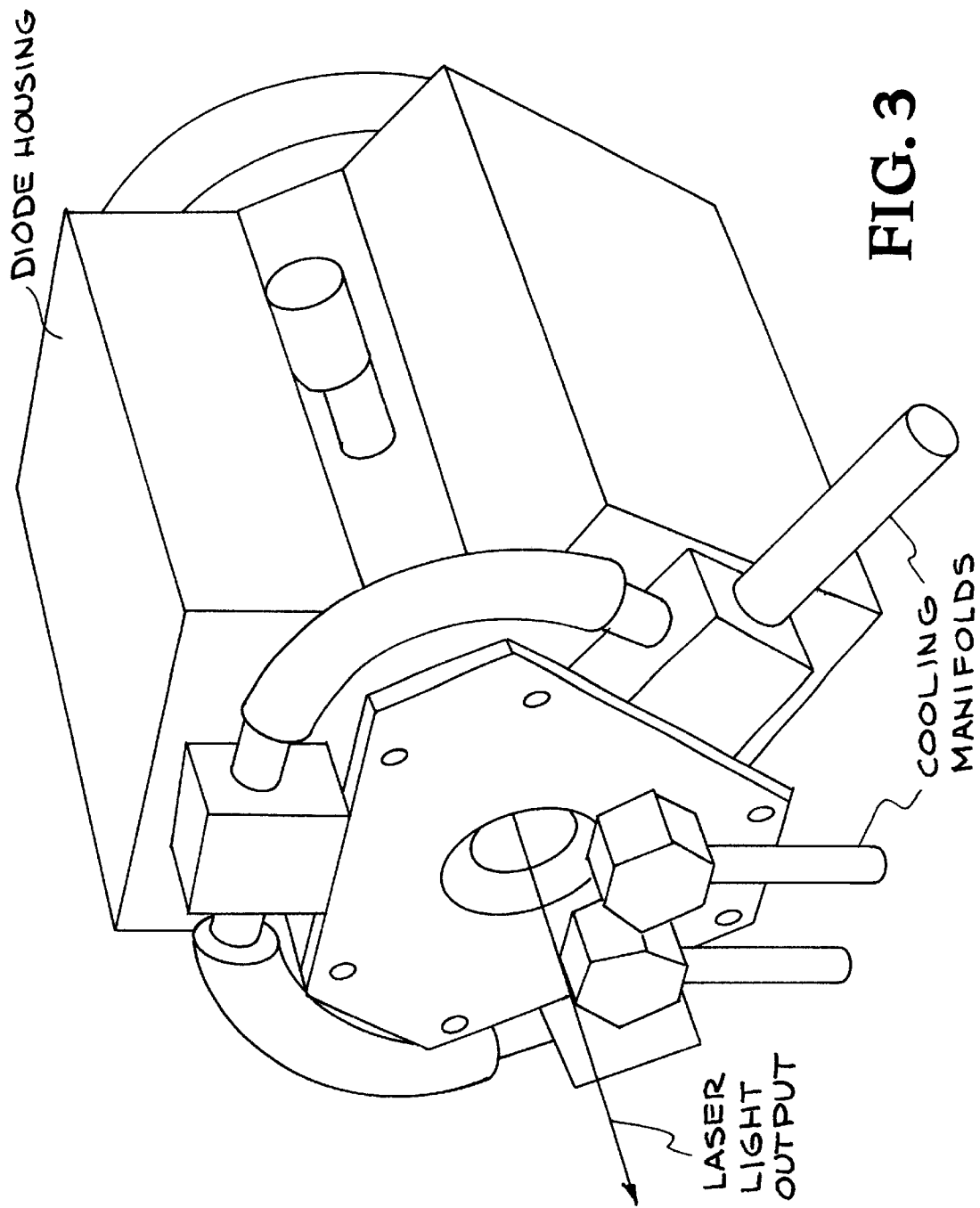

| UNIT | AVERAGE POWER | ACCUMULATED HOURS | LBO DAMAGE | LBO OVER TEMP | HEAD LEAK | LASER ROD | REFURBISH HEAD | DIODE | OPTICS | POWER SUPPLY | RF DRIVER | Q-SWITCH | TOTAL |
|---|---|---|---|---|---|---|---|---|---|---|---|---|---|
| #1 | 136 | 7452 | 0 | 6 | 1 | 1 | 1 | 0 | 1 | 0 | 0 | 1 | 11 |
| #2 | 148 | 7536 | 1 | 0 | 0 | 1 | 2 | 1 | 2 | 0 | 0 | 0 | 7 |
| #3 | 132 | 9977 | 1 | 1 | 0 | 0 | 1 | 0 | 1 | 1 | 1 | 0 | 6 |
| #4 | 135 | 11136 | 0 | 5 | 0 | 0 | 1 | 0 | 0 | 0 | 0 | 0 | 6 |
| ADP1 | 206 | 4237 | 1 | 0 | 0 | 0 | 0 | 0 | 0 | 0 | 0 | 0 | 1 |
| TOTAL | | 40428 | 3 | 12 | 1 | 2 | 5 | 1 | 4 | 1 | 1 | 1 | 31 |
| | | | CRACKED | CORRECTED | CORRECTED | | | PINHOLE | 3 DICHROIC | | | | |

REASON FOR REPAIR

FIG. 8

SYSTEM FOR BEAMING POWER FROM EARTH TO A HIGH ALTITUDE PLATFORM

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of Endeavor

The present invention relates in general to the art of power beaming and more particularly to a laser power beaming system.

2. State of Technology

There is an active interest in power beaming to air and space borne platforms and the inverse application, beaming converted solar power back to earth. One concept that has been demonstrated is that a helicopter could be kept aloft with a ground based, high power microwave source. Power beaming to satellites for propulsion using jet ablation has been considered. The concept of capturing solar power from a satellite based photovoltaic array, converting that power to microwaves and transmit that microwave power back to earth for commercial uses has been considered. Power beaming using high power lasers to the lunar surface to support a colony has been considered. Power beaming to satellites at Geosynchronous Earth Orbit (GEO) has been considered. The uses of power beaming to GEO include battery charging, space tugs to change orbit, and for primary power to increase the transponder capacity. A program to measure the solar cell conversion efficiency using various lasers was initiated in support of the overall concept of power beaming. A test of power beaming to a low altitude satellite using both liquid and solid state lasers has been considered by one of the inventors.

NASA has initiated a program involving a high altitude aircraft powered by solar power for the purpose of Environmental Research and Sensor Technology (ERAST). The plan is to keep the aircraft aloft during the night using regenerative fuel cells; but these devices are heavy, inefficient, and beyond the present state of the art.

U.S. Pat. No. 5,260,639 to Russell J. De Young, Michael D. Williams, Gilbert H. Walker, Gregeory L. Schuster, and Ja H. Lee, assigned to The United States of America as represented by the Administrator of the National Aeronautics and Space Administration (NASA), shows a method for remotely powering a device such as a lunar rover. A method of supplying power to a device such as a lunar rover located on a planetary surface is described. At least one, and preferably three, laser satellites are set in orbit around the planet. Each satellite contains a nuclear reactor for generating electrical power. This electrical power is converted into a laser beam which is passed through an amplifying array and directed toward the device such as a lunar rover. The received laser beam is then converted into electrical power for use by the device.

In U.S. Pat. No. 3,781,647 to Peter R. Glaser, assigned to Arthur D. Little, Inc., a method and apparatus for converting solar radiation to electrical power is shown. Solar radiation is collected and converted to microwave energy by means maintained in outer space on a satellite system. The microwave energy is then transmitted to earth and converted to electrical power for distribution. Solar radiation is collected and converted to microwave energy by means maintained in outer space on a satellite system. The microwave energy is then transmitted to earth and converted to electrical power for distribution.

In World Intellectual Property Organization (WIPO) Patent Application WO 98/13909, filed Sep. 3, 1997, by John L. Remo, a system for energy transmission by infrared laser radiation is shown. Strong laser beams in the atmosphere are a danger to air travelers and subject to disruption by clouds and other weather and atmospheric conditions. Infrared laser radiation does not pose the danger to air travelers or disruption by clouds and other weather and atmospheric conditions. Infrared laser radiation is produced at a source location. The infrared laser energy is transferred to an energy consuming location. The infrared laser radiation is converted to light at another wavelength at the energy consuming location. The light at the other wavelength is visible and can be converted photoelectrically to electrical energy. The electrical energy is produced by converting the visible light photoelectrically to electrical energy. The infrared radiation used is both eye safe and atmospherically transmissive.

SUMMARY OF THE INVENTION

The present invention provides a system for transmitting power between earth and a high altitude platform in sufficient quantities to be useful for various purposes such as powering equipment, propulsion, and other power consuming uses. A power receiving device is utilized to receive the transmitted power. A laser system operated outside of infrared is used to transmit power between earth and the power receiving device. The laser system does not require adaptive optics.

In one embodiment of the invention, power is transmitted from earth to a power receiving device located on a high altitude platform in sufficient quantities to be useful for propulsion, powering equipment, and for various purposes. The power is transmitted by a diode pumped solid state laser system that does not require adaptive optics.

In another embodiment of the invention, power is transmitted between earth and a remote platform at high altitude in sufficient quantities to be useful for propulsion, powering equipment, and for various purposes. A power receiving device is located on the remote platform. Power is transmitted between earth and the power receiving device using an array of individual lasers. Each of the lasers in the array produces a beam with a selected initial beam diameter that will provide an arrival beam with a desired spot size to fit within a desired area and pattern on the power receiving device.

In another embodiment of the invention a radar system has automatic control of the laser beam shutter. The automatic radar uses a phased array antenna to produce a narrow angle beam. The radar beam is boresighted to the laser beam and the parameters arranged such that when an aircraft is detected at the outer edges of the radar beam, the laser shutter is closed before the aircraft can intersect the laser which is in the middle of the radar beam. A video camera, also boresighted to the laser beam, provides a visual record of aircraft passing through the radar beam thereby documenting the laser shutter closure for recording purposes. In addition to aircraft detection, contact is maintained with the US Space Command who transmits satellite passage information so that the laser can be shuttered to avoid intersection with satellites.

Additional aspects, advantages, and features of the invention are set forth in part in the following description. Various aspects, advantages, and features of the invention will become apparent to those skilled in the art upon examination of the description and by practice of the invention.

BRIEF DESCRIPTION OF THE DRAWINGS

FIG. 3 shows the DPSSL laser head.

FIG. 8 is a tabular summary of lifetime data for 5 DPSSL's.

FIG. 16 illustrates a concept of using a separate beam director to follow wing pattern.

DETAILED DESCRIPTION OF THE INVENTION

Figure 1:
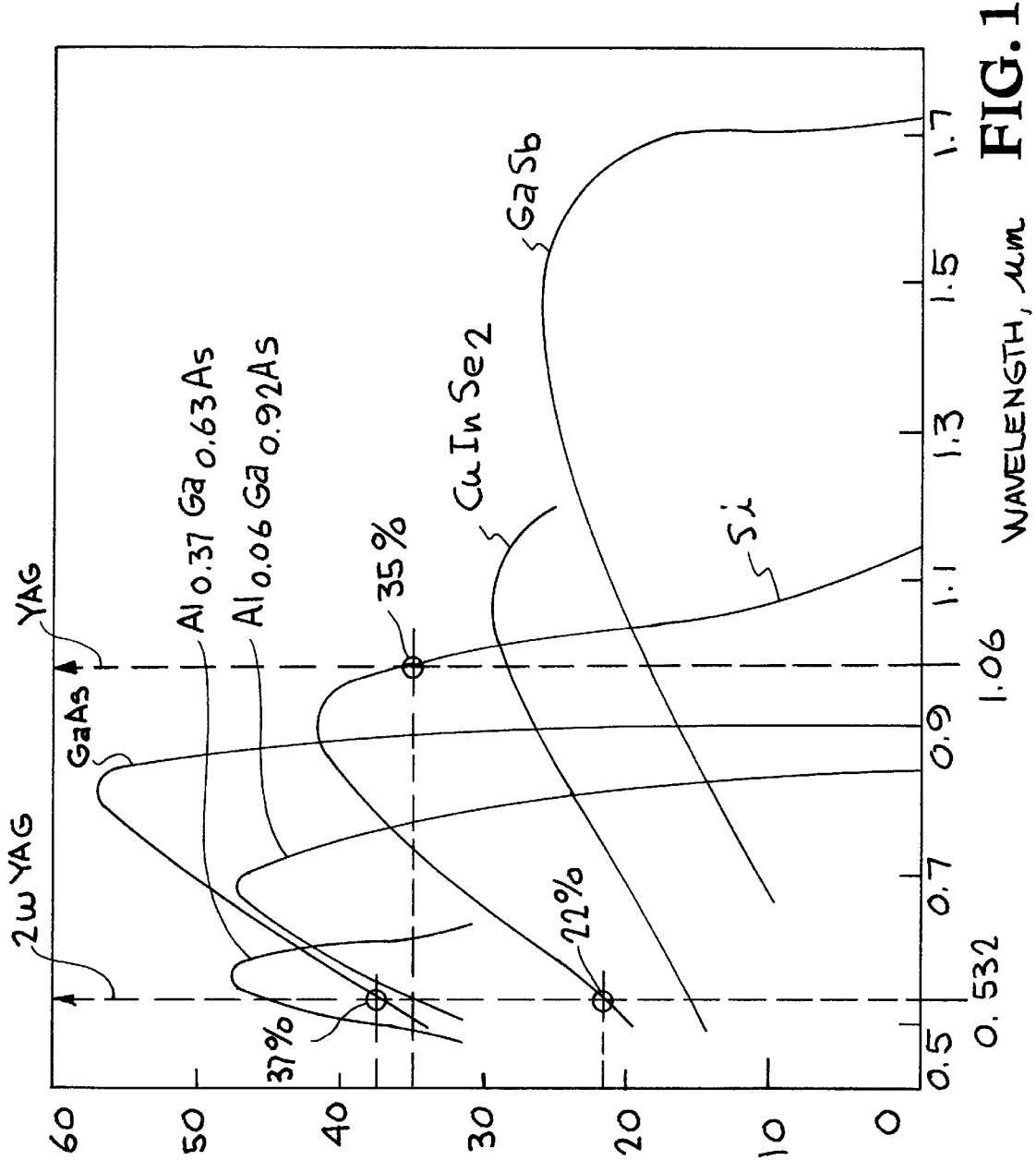
FIG. 1 shows solar cell conversion efficiency for various solar cell materials.

Referring now to the drawings, an embodiment of the invention is illustrated and described. The present invention provides a system for transmitting optical power between earth and a suspended structure at the top of the earth's atmosphere. The power transmitted is in sufficient quantities to be useful for powering electrical equipment on board the platform for various uses. A photovoltaic (PV) cell array is located on the platform and is placed on the underside so as to be accessible from laser radiation from the earth. The PV cell array is mounted on a part of the platform which is also transparent to solar radiation from above. The PV cells are sufficiently thin so that solar radiation can also contribute to the power conversion; and in case of interruption of the laser power beaming, the solar radiation can provide backup power.

The laser system used for the power beaming is a diode pumped solid state system using Nd:YAG rods as the lasing media. The laser system does not require adaptive optics. The laser is a diode pumped Nd:YAG rod which can be operated in the fundamental CW IR or pulsed green modes and uses a Compound Parabolic Concentrator to direct the diode light to the laser rod in a compact, efficient manner. The CPC allows many passes of the diode light through the laser rod thereby reducing the sensitivity of the diode wavelength to the efficiency of the laser. This property also decreases the sensitivity of the diode thermal management system and improves efficiency. The system is operated in the Continuous Wave mode at the fundamental wavelength of 1.06 microns as the preferred choice. If considerations such as the PV cell conversion favor shorter wavelengths, the laser system can be operated in the second harmonic pulsed mode at 0.532 microns with some loss in efficiency. For operation in this repetitively pulsed mode, several lasers would be staggered to increase the duty cycle and alleviate the deleterious effects of transients in the solar cells.

The laser system is operated outside of infrared to transmit power between earth and the power receiving device. The dictionary definition of infrared is: situated outside the visible spectrum at its red end—used of radiation having a wavelength between about 700 nanometers and 1 millimeter There may some ambiguity in the definition of infrared. Scientists working in the visible or UV, call 1.06 microns near infrared. Scientists working call 1.06 microns visible. The laser system of the present invention can be operated at laser wavelengths in the range 0.5 microns to 1.1 mircrons.

The lasers are combined in a parallel array and mounted on a beam director to form a beam of sufficient total power. The design of the laser modules is significant because the high efficiency, compact diode pumped laser head lends itself to a dense stacking arrangement for the total beam array. The laser heads themselves are arranged in a "double-headed" configuration with two laser heads and a birefringence compensator in one optical cavity to increase the beam quality.

An important consideration in the present invention is the realization that for platform altitudes of 30 km or less, the beam spreading effects of atmospheric turbulence are not important for the sizes of the PV cell array. Compensation of atmospheric turbulence by adaptive optics is not required thereby simplifying the beam director significantly. The impact of this consideration is that the individual laser beams which comprise the array, need to be expanded only to ≈20 cm which is approximately the atmospheric turbulence scale, in order to produce a spot size at the platform which matches the short dimension of the PV array. In addition, this dimension is approximately the cross section of the laser head so the packing fraction of the laser array is minimized.

Another feature of the laser system is that each laser in the array can be individually pointed to a position on the PV cell array on the platform minimizing the overfill fraction. Again this is possible because atmospheric correction is not needed and the beam diameter can be small.

Acquisition and tracking of the platform will be accomplished by a sequence of steps from coarse to fine tracking ending with aimpoint selection and maintenance. Conventional radar will locate the platform and will direct a wide angle laser beam to the platform. Corner cube reflectors on the target and a photodetector on the ground will be used to direct an infrared camera and small receiving telescope to the platform. The image of the platform will be used to point each laser in the array to minimize the overfill factor. An on-board ammeter operated in a closed loop control circuit will maintain the laser pointing to maximize the power beaming efficiency.

Since eye safety for laser beams of this power level is important, an integrated safety system is a feature of this invention. Direct beam viewing will cause instantaneous eye damage; and, therefore, a system to prevent the laser beam from intersecting aircraft is essential. Aside from non automatic means such as visual observers and wide area radars, a radar system with automatic control of the laser beam is incorporated into this invention. This automatic radar uses a phased array antenna (commercially available) to produce a narrow angle beam. The radar beam is boresighted to the laser beam and the parameters arranged such that when an aircraft is detected at the outer edges of the radar beam, the laser shutter is closed before the aircraft can intersect the laser which is in the middle of the radar beam. An additional feature is a video camera with field of view slightly larger than the radar which monitors the passage of an aircraft. The lights of the aircraft are used during the nighttime hours. When the radar senses an aircraft and closes the laser shutter, a small xenon flash bulb near the video camera is triggered which causes a whiteout of one frame of the video. After that event, the video camera records the passage of the aircraft with the laser beam shut off as the aircraft exits the radar field of view. This entire sequence is recorded on a separate VCR and serves as a record for insurance purposes.

In addition to the aircraft detection scheme, contact is maintained with the US Space Command who transmits satellite passage information so that the laser can be shuttered to avoid intersection with satellites.

In a preferred embodiment of the present invention power is beamed to a high altitude aircraft or to a balloon. The platform will reach the 100,000 ft altitude. An example of the aircraft platform is the Centurion model manufactured by Aerovironment of Monrovia, Calif., and described on the NASA Dryden website. This vehicle is a solar-powered craft designed to reach one of the goals of the ERAST program, to fly a payload of scientific data-gathering instruments at an ultra-high altitude of 100,000 feet. The wing span is 60 m with a chord of 5 m delivering 31 kW of electrical power to the on-board bus assuming a solar panel conversion efficiency of approximately 14%. Out of this 31 kW, 10 kW are used to power the 14 electric motors which keep the plane aloft and the remaining 20 kW would be used to regenerate the fuel cells on an "hour for hour" basis.

During the night time hours, the fuel cells would generate electric power with a 50% efficiency delivering 10 kW to the motors. The high weight of the fuel cells reduce payload to the hundred pound level and the fuel cells and do not presently exist in anything other than a conceptual design.

The present invention provides a system to power beam laser energy during the night to eliminate or at least reduce the amount of the fuel cells needed. A system is provided using a laser at a wavelength of 1.06 microns which is close to the optimum wavelength of the silicon solar cells to be used on the aircraft platform, the conversion efficiency is 35%. This conversion efficiency is more than double that obtained with broadband solar flux. In order to provide the 10 kW (electric) needed to sustain flight, the laser would need to deliver only 30 kW flux to the platform whereas if the full 30 kW (electric) were needed, the laser flux at the platform of 90 kW would be required. These laser power levels are delivered to the platform and exclude atmospheric losses, losses due to overspreading, optical losses, etc. Taking these losses into account could easily bring the total laser power required to the 50–150 kW power level.

In designing the laser system an analysis was completed on the expected conversion efficiency of the solar cells. An illustration of the dependence of various solar cells on the wavelength of the incident light is shown in FIG. 1. This figure shows the expected conversion efficiency of six solar cell materials.

The conversion efficiency at the 1.06 micron and 532 nm wavelength are in the 20–35% range, both higher than the best conversion efficiency obtained with broadband solar radiation. As a first choice, the 1.06 micron wavelength is preferred and considered by some to be ideal, for silicon solar cells. However, since this wavelength intersects the solar cell performance curve on a steeply rising portion, the actual conversion efficiency of a specific cell may be considerably different and the shorter wavelength may be the better choice.

Figure 7:
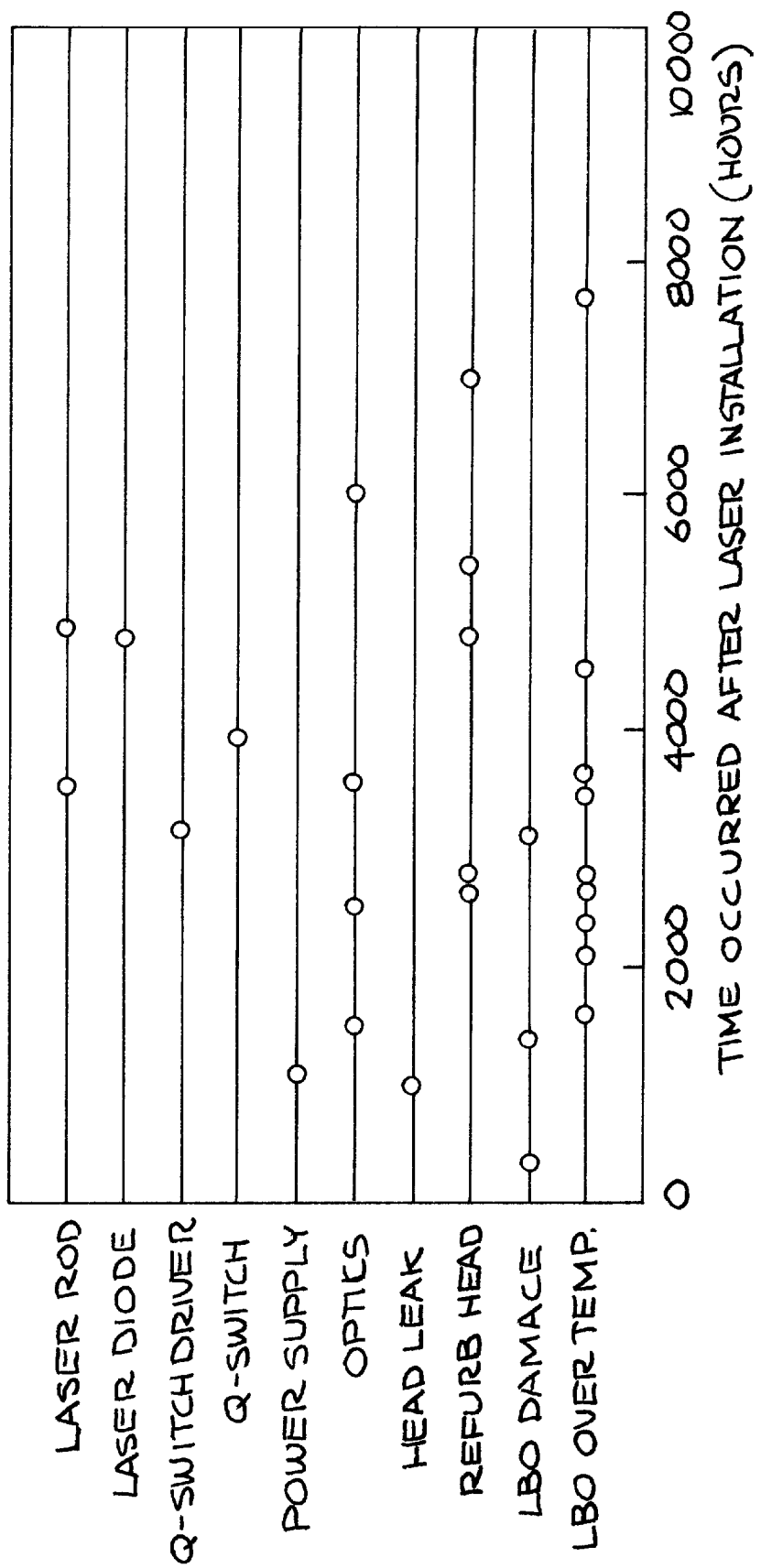
FIG. 7 is a summary of lifetime data for the pulse green mode of operation.

If the second harmonic (green) wavelength is chosen, then the laser is not CW but must be repetitively pulsed instead. In this case of the green wavelength, the laser needs to be repetitively pulsed for high efficiency by the nature of the second harmonic generation process which is driven by high peak power considerations. The laser pulse format for the green wavelength is then characterized by a pulse duration of $\tau_p$=100 ns and a repetition rate of PRF=30 kHz. This gives a duty cycle defined as $\tau_p \times$PRF=0.3%. A summary of lifetime data for the pulse green mode of operation is shown in FIG. 7.

The effects of pulse duration, repetition rate, duty cycle, average power, etc., on the electrical conversion efficiency are complex; but in general, for average powers comparable to one equivalent sun, the conversion efficiency is lower than that obtained by pure CW operation. The pulsed laser conversion efficiency approaches the CW limit when the duty cycle exceeds approximately 1% so that by combining several pulsed lasers in an appropriate fashion, the duty cycle can be increased. This staging can be done either by adjusting the lasers to effectively increase the pulse duration, i.e. "head to tail stacking" or the repetition rate.

A significant factor in the propagation of the laser power to the target is the degree of atmospheric turbulence compensation required to keep the power from overfilling the target (aircraft solar cells) at the mission altitude. The propagation characteristics are determined by the atmospheric turbulence scale, often referred to as the Fried parameter, $r_o$, which under normal sea level condition is about 5 cm (median value) at the reference wavelength of 500 nm.

At reasonably good sites such as found at typical astronomical sites at 1 km altitude in the continental United States, this value can be 10–15 cm whereas at the best astronomical sites in the world, i.e. Hawaii at 4 km altitude and parts of Chile at lower altitudes, the value of $r_o$ can be as high as 20–25 cm. Since $r_0$ scales as $\lambda^{6/5}$ where $\lambda$ is the laser wavelength, for the primary case to be considered here, the values of $r_o$ are 12.5 cm, 25–37.5 cm and 50–62.5 cm for the sea level, typical astronomical and best astronomical sites, respectively.

For no atmospheric correction whatsoever, the theoretical divergence angle of a laser beam projected out of a beam director is given by ($\lambda$/d) where d is the diameter of the output beam. In the presence of turbulence, however, the minimum beam divergence is limited to ($\lambda/r_o$) when $r_o$<d. Thus for the highest aircraft altitude considered of 100,000 feet (30 km), the spot diameter for a perfect beam is 25 cm for the sea level case, 9–13 cm for the reasonable astronomical sites and as low as 5–6 cm for the best astronomical sites. Of course, the diameter of the beam projector must increase as $_o$ increases so the size and cost of the projector array will increase considerably if those small spot diameters are needed.

However, in all these cases, the spot diameter is certainly smaller than the wing length and more importantly, smaller than the wing chord. For the ERAST mission, the wing chord is approximately 5 m so the spot diameter is 20 times smaller. This means that in order to illuminate the wing with minimal overfill, the beam divergence of the laser can be 20 times worse than a perfect beam or in laser terms, that the beam quality of the laser can be 20 times diffraction limited. At better sites, the requirements on beam quality can be relaxed even further. The issue in this discussion is that since scaling to higher power lasers often means a reduction in beam quality, relative simple lasers can be used for this mission.

The concept of beam quality is complex and the assignment of one parameter to describe beam quality is imprecise. The normal definition of beam quality and the one used in this document is the divergence angle for that portion of the beam which contains a large fraction of the total beam energy, i.e. >80%. The exact amount depends on details of the beam intensity profile such as uniform illumination, Gaussian, etc., and the shape of the output aperture, i.e. round, square, etc. Other definitions such as the on axis intensity (Strehl ratio), Full Width at Half Maximum (FWHM) are also possible and shed light on other features of the beam quality.

Another important factor is that since no adaptive optics is needed, each beam can propagate independently; and it is not necessary to coherently combine each beam on a large beam director. It is necessary only to combine the beams on the target. Furthermore since the wing has a high rectangular aspect ratio, individual laser beams or groups of laser beams can be directed to different portions of the wing to track the wing as it executes small circular patterns as it maintains its station aloft.

This mode of operation is in sharp contrast with propagation to orbiting satellites which, because of the larger propagation distance, do require larger diameter beam directors, i.e. $d \gg r_o$ and therefore do require adaptive optics. The need for adaptive optics significantly raises the complexity and cost of the laser system. For this aircraft platform described above, the laser system is relatively inexpensive.

Figure 2A:
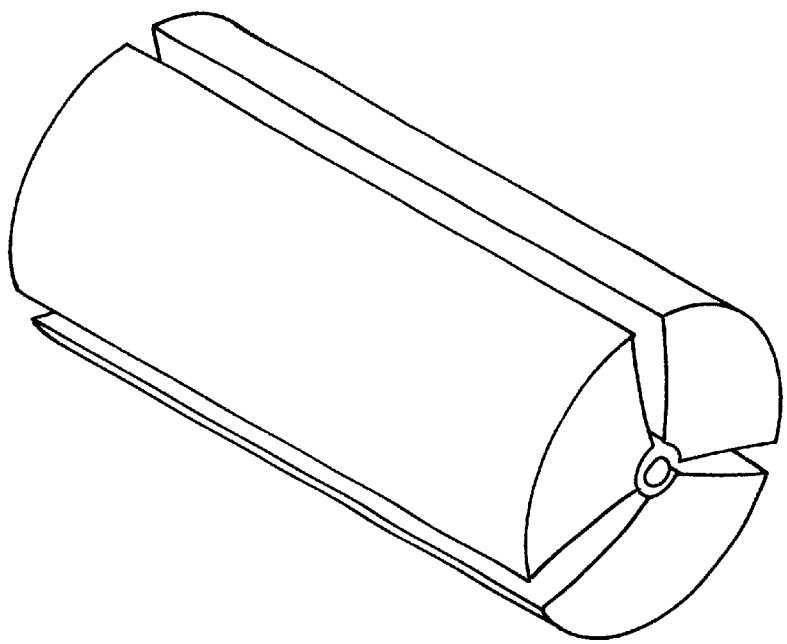
FIGS. 2A and 2B illustrate a design concept for a DPSSL used in the power beaming.
Figure 2B:
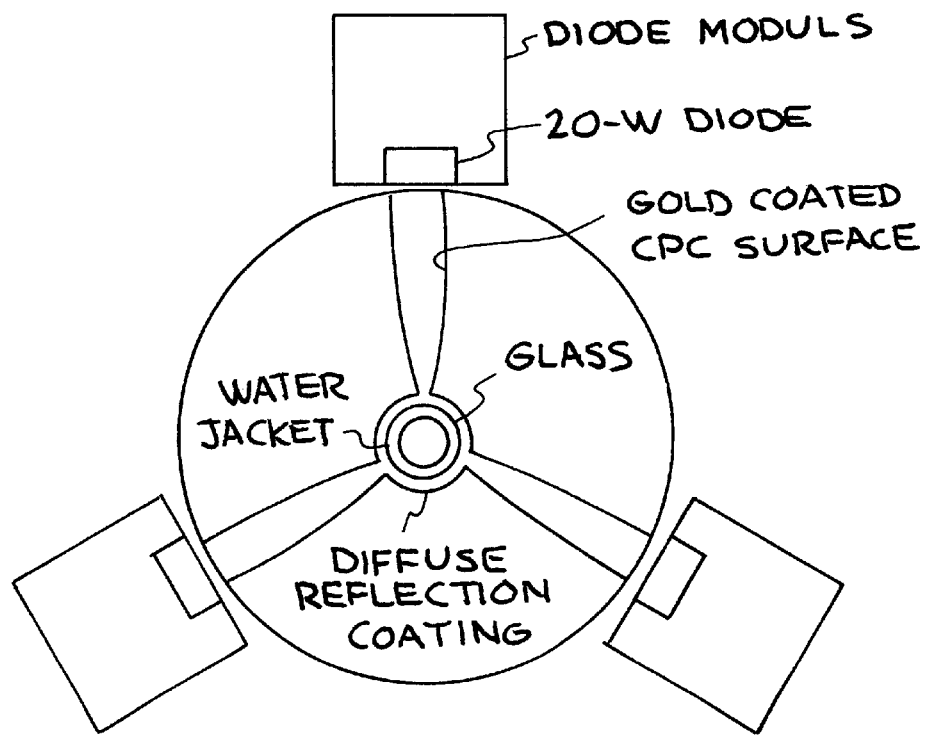

The laser device for providing power to the aircraft platform described above, is a DPSSL operated either in the CW IR mode at 1.06 microns or in the pulsed, second harmonic mode at 532 nm. A conceptual diagram of the DPSSL 10 is shown in FIGS. 2A and 2B. Three diode modules 11 containing 24 diode bars each are focused onto a cylindrical YAG pump chamber 12 using the focussing properties of a Compound Parabolic Concentrator (CPC) 13. The CPC 13 efficiently transfers the widely divergent diode light to the pump chamber 12 through a series of shallow angle reflections. Light from the exit of the CPC 13 passes through the YAG rod with a possibility of many passes since the output area of the CPC 13 is a small fraction of the YAG pump surface area.

The laser that is preferred for providing power to the aircraft platform is described in U.S. Provisional Patent Application Serial No. 60/166,464, by Jim J. Chang, titled Diode-Pumped Laser Apparatus with Improved Pumping Design, filed Nov. 19, 1999. This patent application describes a new laser pumping design to improve the efficiency and reduce the cost of diode-pumped solid-state lasers. This design employs quasi-three-dimensional CPC light channels to side-pump a laser rod enclosed in a laser pump chamber. The pump radiation from laser diodes is delivered to the pump chamber by the light channels. The pump radiation that enters the pump chamber is then distributed by the pump chamber to achieve uniform pumping of a laser rod. The surfaces of the pump chamber are constructed by either surface or volume diffusers. The design of the pump chamber enables efficient trapping the pump light once it enters the cavity. This leads to efficient recycling of unused pump radiation for improved laser performance. As a result, this improved pump design results in a more cost-effective diode-pump laser system.

The background of this new design will now be summarized. Solid-state lasers pumped by high-power laser diodes have been used for many years in a wide range of applications. Conventional diode-pumped solid-state lasers are classified as end-pump and side-pump systems. The end-pump configuration usually leads to higher laser efficiency because of a better overlap between the pump beam and the laser cavity mode. At high power, however, end pumping becomes less effective because of the difficulty of coupling a large amount of laser-diode output into the small end of a laser rod (i.e., typically has a diameter of 2–6 mm). A side-pumped geometry is therefore mostly chosen for high-power designs because of the relatively large barrel surface of a rod that can be used for pumping. Conventional side-pump schemes have the disadvantage of short optical path across the diameter of the laser rod. This results in poor pumping efficiency because a large fi-action of the pump radiation is not deposited into the laser rod. This characteristic also makes side-pump lasers more sensitive to diode-radiation wavelength, which determines the absorption of pump radiation in a laser rod. These disadvantages considerably reduce the side-pumped laser efficiency.

A problem plaguing both end-pump and side-pump configurations is that of inhomogeneous pumping. The side-pump laser has to balance beer's law absorption that tends to deposit the power closer to the surface closest to the emitter against the loss of absorption efficiency encountered when a lightly doped rod is used to permit deeper penetration. In addition, diode light concentration using conventional optics such as lenses often limits the number of emitters that can be circled around the rod. The end-pump laser using an imaging device to demagnify the emitting diode array results in imprints of the diode array image at the end of the rod. Guiding inside curved surfaces of the rod, leads to a repeating sequence of these images. Inevitably, both geometries end up with hot and cold spots. This limits the average output attainable because of wavefront distortion and depolarization. To resolve these issues, Jim Chang invented a side-pumped scheme with a novel pump cavity configuration that can improve laser performance.

In FIGS. 1A and 1B of U.S. Pat. No. 5,978,407 to J. J. Chang et al, assigned to United States Enrichment Corporation, illustrate the cross-section of a side-pumped laser design. The 2-dimensional (2-D) compound parabolic concentrators (CPCs) channel the pump radiation into a small pump chamber through narrow slots. A laser rod is located inside the pump chamber to receive the pump radiation. The slots on the pump chamber need to be small to prevent much pump radiation from escaping once it enters the chamber. The CPC output slot width b, in the 2-dimensional analysis has a theoretical minimum expressed as $$b = a \sin 9/n,$$

Where n is the refractive index of the medium in the volume of the CPC (i.e., n=1 for air and rr-1.3 for water, 1.5 for glass), a is the width of the CPC input opening, and 9 is the beam divergence of the laser-diode radiation that enters the CPC. The surfaces of a CPC have high reflectivity coating to minimize its transmission loss. This side-pump configuration is further improved by optimizing the designs of the CPC light channels and diffusers of the pump chamber will now be described.

The 2-D CPC shown in FIGS. 1A and 1B of U.S. Pat. No. 5,978,407 to J. J. Chang et al, has been improved to quasi-3D CPC to optimize the compression of the pump radiation into the pump chamber. As illustrated in FIG. 3, this quasi-3D CPC is constructed by converting the two parallel side surface of a 2-D CPC (FIG. 2) into a CPC or a straight trough. This new design enables us to reduce the volume of both the pump chamber and laser rod while maintaining the same amount of pump radiation that is channeled into the pump chamber. This not only lowers the lasing threshold, but also increases the density of the pump radiation in the chamber. Theoretical estimation indicates that about three-fold increase of pump density in the pump chamber when a quasi-3D CPC is used to replace a 2-D CPC. The increased pump density also allows the pumping of quasi-three-level laser systems (Yb, Ho, and Tm), which have a relatively high lasing threshold. The four surfaces of the quasi-3D CPC are formed by shaping metal blocks and are highly reflective.

The diffused surfaces of the pump chamber are constructed by either volume diffusers or surface diffusers. A volume diffuser is typically made from porous material such as ceramics that scatters the light through the depth of the material. A surface diffuser can be a metal surface with roughened surface texture that reflects light in a random manner. One of the issues of our previous design (i.e., U.S. patent application Ser. No. 08/825564) is the highly directional pump radiation during the first path in the pump chamber (i.e. before hitting the wall of the pump chamber). This can lead to non-uniform pumping of the laser rod. One way to resolve this problem is to use a flow tube, as shown in FIG. 1, with roughened outer surface, which tends to diffuse the pump radiation before it enters the laser rod.

The CPC 13 separates the diodes 10 from the YAG pump cavity 12 thereby easing the requirements of the diode cooling system. The cooling for the YAG rod is separated from that of the diodes further simplifying the design. More importantly, the possibility of multiple passes through the rod allows the diode wavelength to be off the peak of the YAG absorption curve. In other pumping geometries, these photons would be partially absorbed with the rest passing out of the rod and would be lost as far as pumping is concerned. The net result is that for these other lasers, the emission wavelength of the diode needs to be carefully controlled and this requires tighter initial diode selection and temperature control.

Figure 4A:
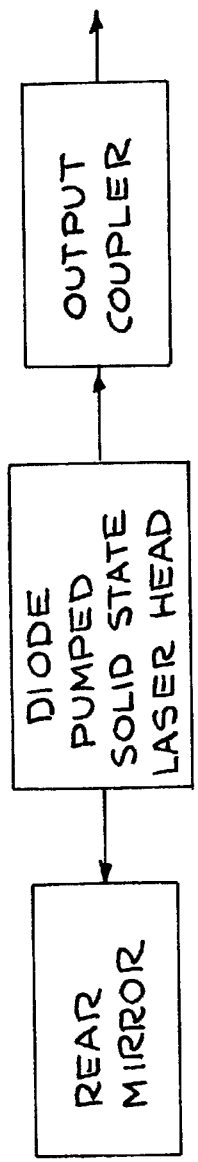
FIG. 4 shows cavity configurations for the DPSSL, (a) CW IR and (b) pulsed, second harmonic.
Figure 4B:
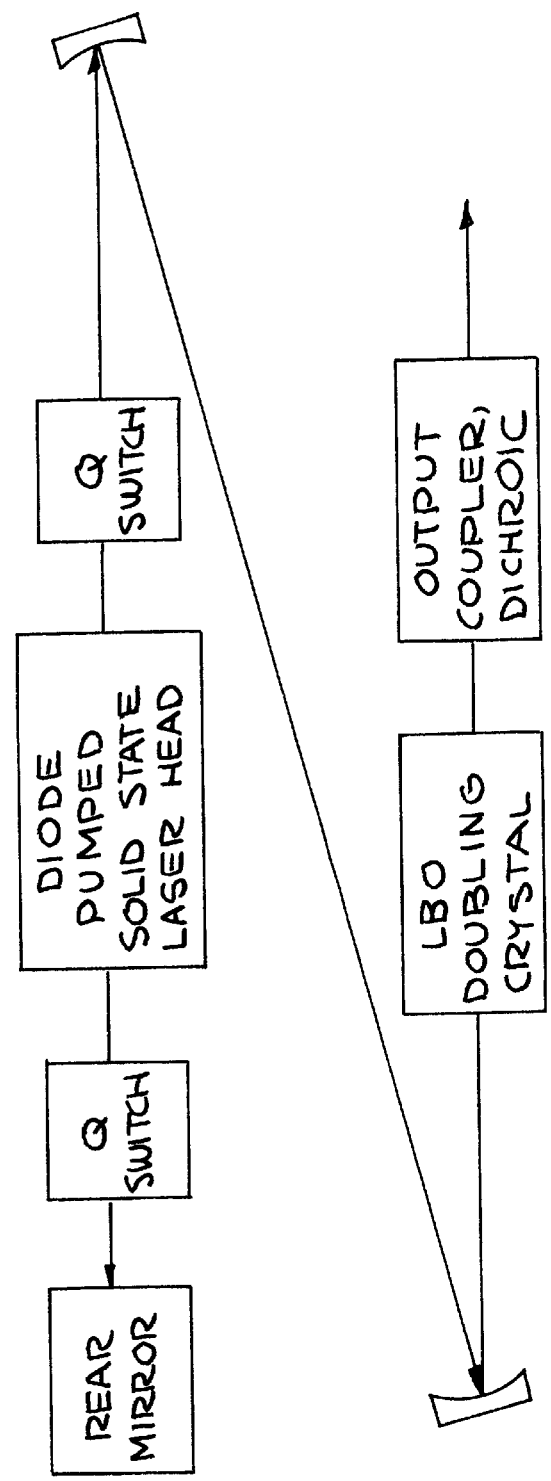
Figure 5:
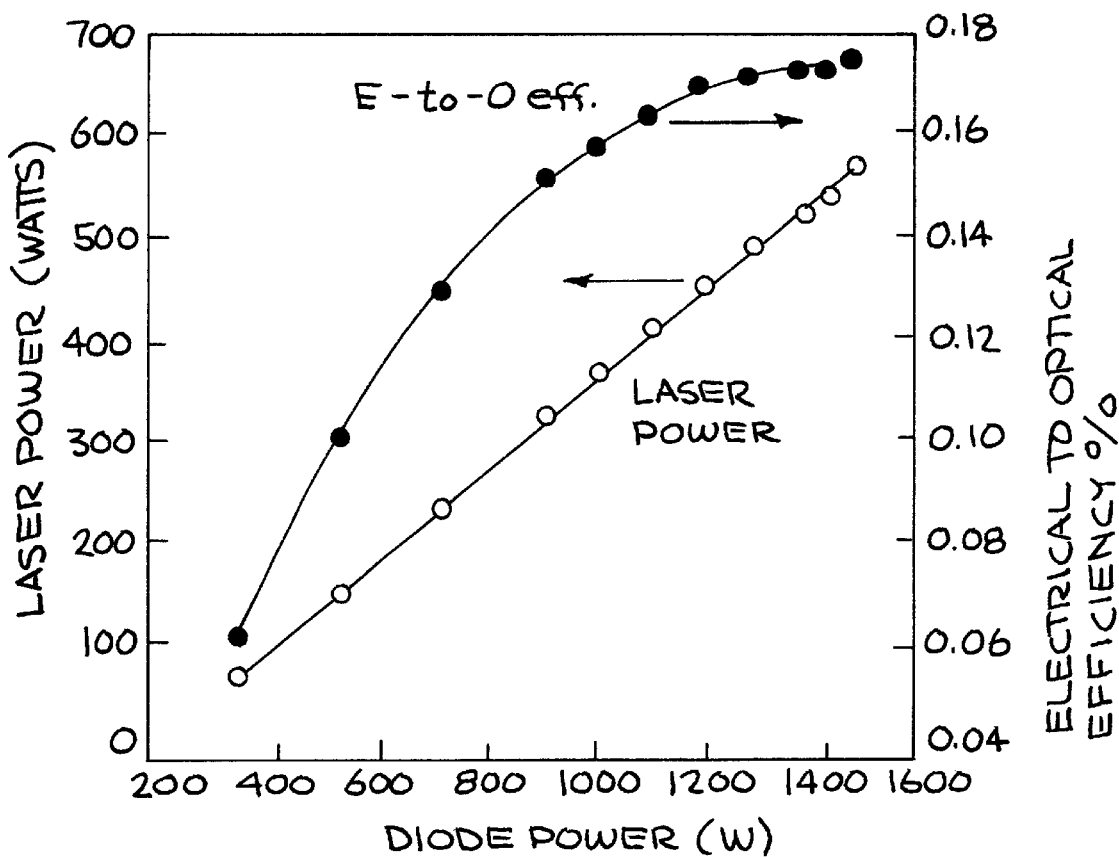
FIG. 5 describes performance levels of the DPSSL in the CW IR mode.
Figure 6:
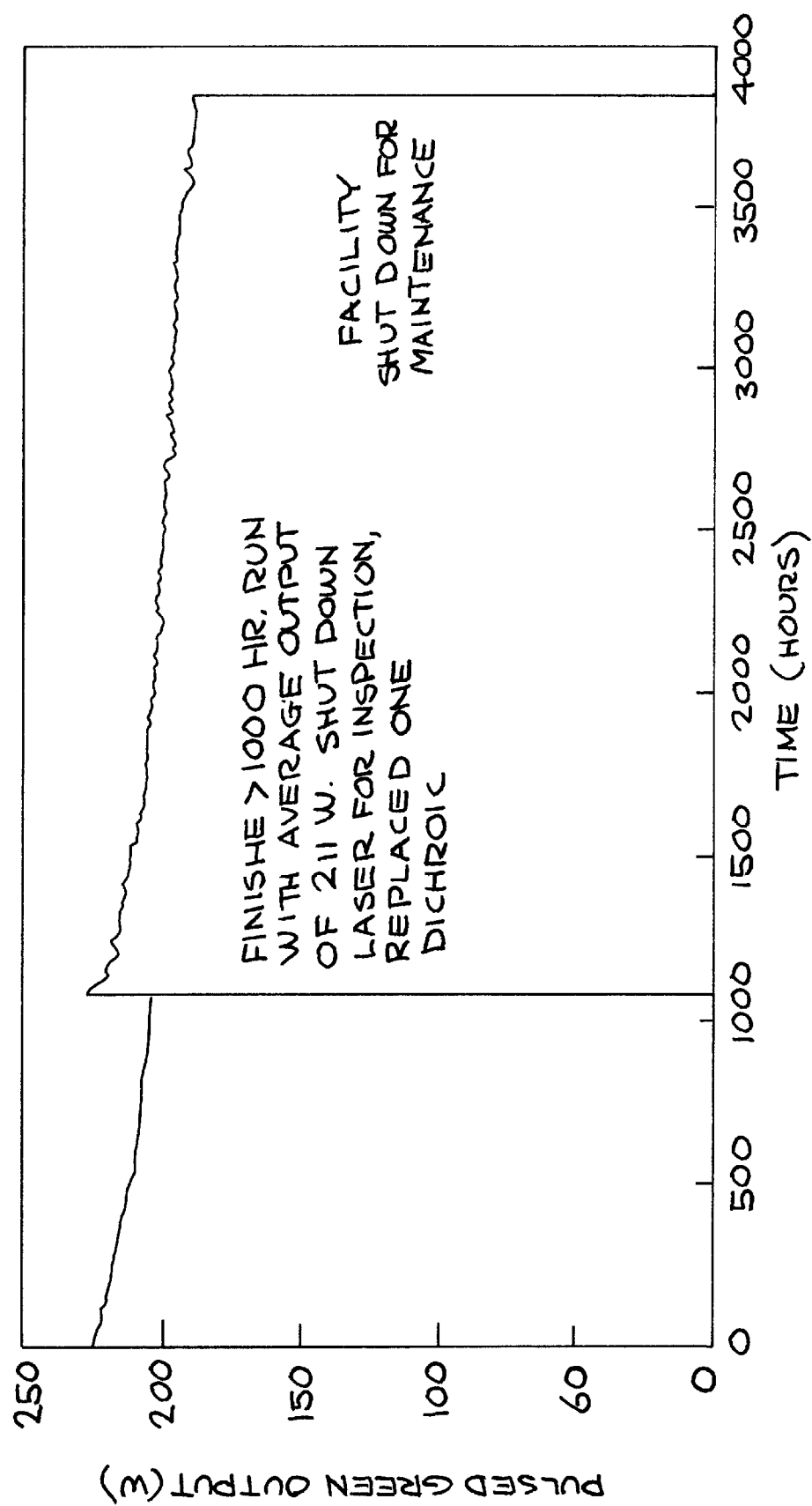
FIG. 6 provides lifetime data for the pulsed green mode.

An illustration of the DPSSL 10 is shown in FIG. 3. The optical cavity for these laser heads can be operated either in the CW IR mode as shown in FIG. 4A or in the pulsed green mode as shown in FIG. 4B. In the pulsed green mode, a set of acousto-optic Q switches and a doubling crystal are put in a cavity configuration such as the "Z" configuration illustrated in FIG. 4B, to generate the light at the second harmonic. The performance of the DPSSL 10 in the CW IR mode is shown in FIG. 5 showing power levels in excess of 500 W and electrical to optical efficiency of 17.5%. For the pulsed green, power levels of over 300 W have been achieved. At reduced power, FIG. 6 shows lifetime data for almost 4000 hours.

Two modifications can be made to the DPSSL described above, one involves using a simpler and more efficient pump cavity and the other involves scaling to twice the output power. The first modification reduces the number of CPC pump chambers from three to one and improves the coupling coefficient from the diode light into the YAG rod. This modification should reduce cost and complexity of the DPSSL. U.S. Pat. No. 5,978,407 to J. J. Chang et al, assigned to United States Enrichment Corporation, describes a compact and highly efficient laser pump cavity. The laser system can be operated in several modes: (1) the fundamental Continuous Wave (CW) at 1.06 micron at a power level of 450 W, (2) a repetitively pulsed, 1.06 micron mode at approximately 400 W and (3) a repetitively pulsed second harmonic mode at 532 nm at 300 W. This patent describes one modification and the disclosure of this patent is incorporated herein by reference. A tabular summary of lifetime data for 5 DPSSL's is shown in FIG. 8.

The second improvement involves adding a second DPSSL head inside the cavity with an optical element between the two heads to reduce the effects of birefringence. This modification will increase the CW IR power to the kilowatt level and reduce the beam quality from approximately 30 to 15 times the diffraction limit.

Figure 9:
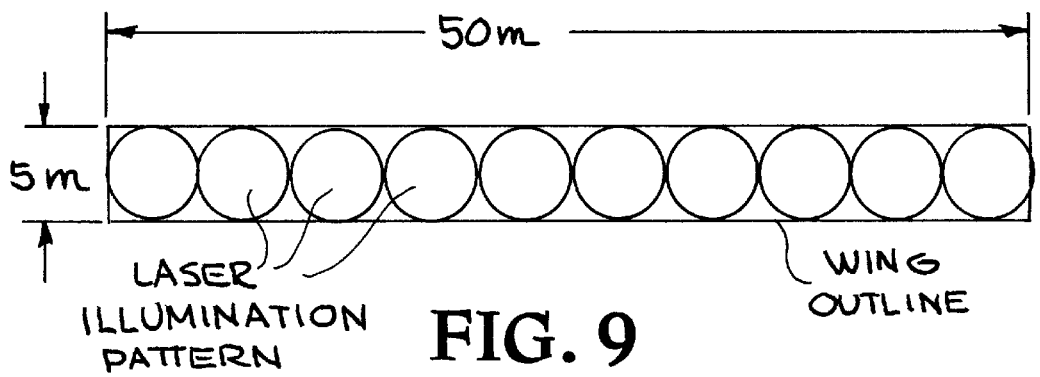
FIG. 9 shows an illumination pattern for a laser array at the target.

For the highest altitude and therefore worst case for the ERAST system, the electrical power requirements are as high as 30 kW delivered to the bus. Assuming a 30% laser to electrical conversion efficiency for the 1.06 micron laser and silicon solar cell, the laser power delivered to the wing needs to be 100 kW, neglecting for the moment any losses in the atmosphere. Assuming a wing dimension of 5 m×50 m, and an array of 100, 1 kW lasers, the illumination pattern 14 would be as shown in FIG. 9. Here it has been assumed that each laser has an output beam comparable to 12.5 cm. In practice, it is beneficial to make the output beam diameter somewhat larger than $r_0$ and a value of 20 cm is chosen. In other situations, the output beam diameter would be larger and the beam quality of the laser could then be relaxed.

The details of this analysis are more evident when one considers the full scale dimension of the laser array beam director. At an output beam diameter of 20 cm, the projected cross sectional dimension of the individual lasers is about 30 cm on a side, assuming for the moment, a square cross section for the individual lasers. Then assuming a square array for the 100 laser, i.e. a 10×10 array, the beam director is a square 3 meters on a side.

Three meter beam directors or telescopes in the astronomical application are common place at this time, even with high slew rates as in the case of the new 3 m telescope at the Starfire Optical Range at Kirtland AFB in New Mexico. For the essentially static case, as would be for the ERAST system, where the tip and tilt of the output beam is small and the basic pointing of the beam director is fixed, the beam director is simpler and less expensive than even the astronomical telescopes.

Figure 10:
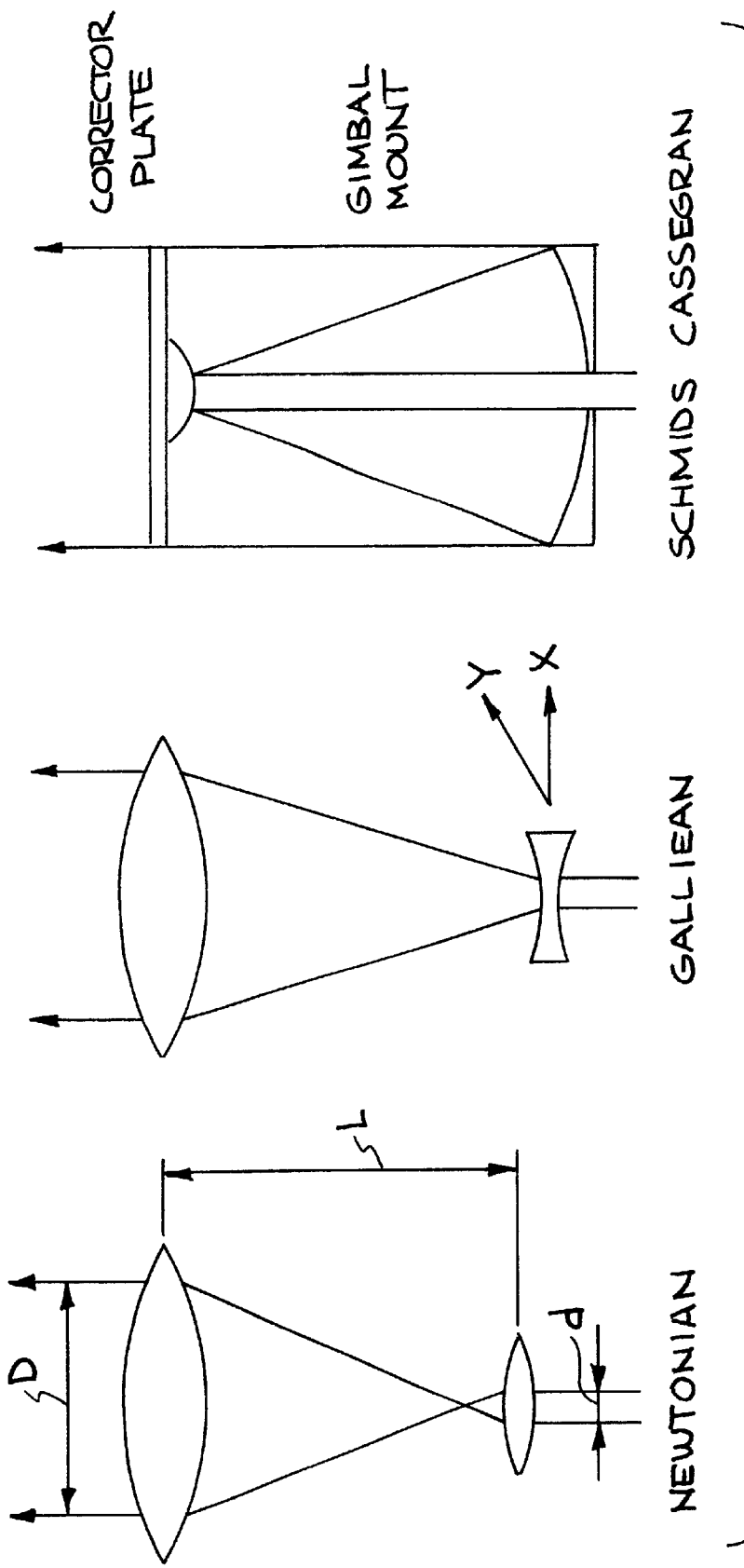
FIG. 10 shows three common types of expansion telescopes.

The beam expander for the individual lasers are usually one of three types, Newtonian 15, Galilean 16, and Schmidt Cassegran 17 shown in FIG. 10. The two refractive telescopes have the advantage that lenses are simpler to align than mirrors; but without complex aspheric surfaces, it is not possible to achieve a low aberration system unless the F# of the telescope is at least >8, especially for systems with a high expansion ratio. In this case the expansion ratio of ≈20 cm/0.5 cm=40. For an F#=8, the length of the telescope is 1.6 m which adds length to the laser chassis. The reflective Cassegrain telescope with the Schmidt corrector plate can achieve the high expansion ratio at a much lower F# resulting in a more compact system. Further, by mounting the secondary of the Cassegrain on the Schmidt plate the need for supporting webs are eliminated. These webs would otherwise be heated by the laser beam and might cause distortions of the secondary position. A well anti-reflection coated Schmidt plate would heat far less than a web and cause negligible distortion even at the kilowatt level.

The power density incident on the Schmidt plate at the kilowatt level is only 3 W/cm² and therefore is not stressing any damage limits of the glass or the anti-reflection coating. AR coatings of <1% are readily available at this wavelength, especially for narrowband conditions; and the corrector plate heating is negligible. Such telescopes are readily commercially available in the amateur astronomical community at reasonable cost even with the extra cost of applying high quality coatings.

Figure 11:
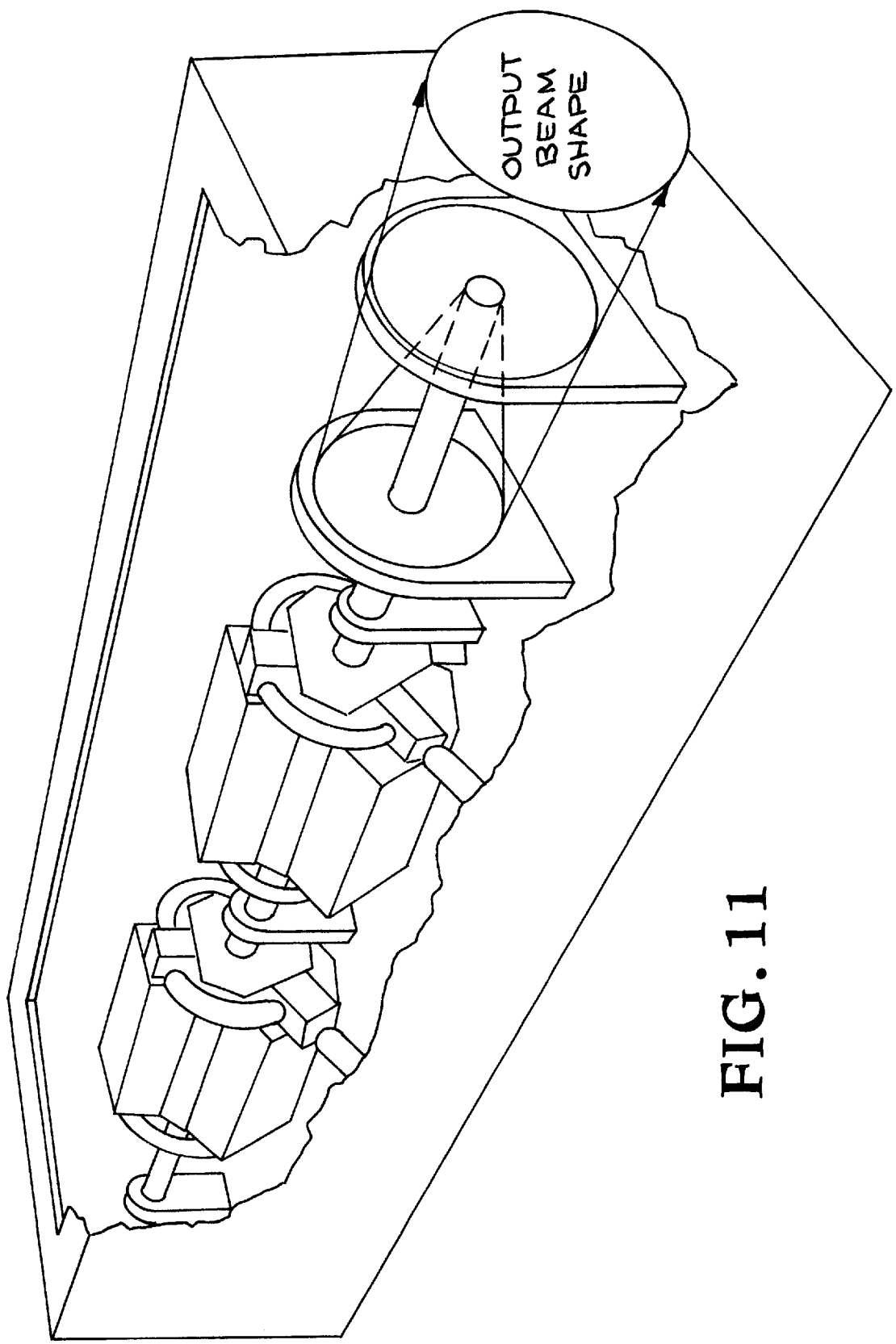
FIG. 11 is an exploded view of a kilowatt laser module with square cross section.

A sketch of an individual laser module 18 with the Cassegrain telescope and two DPSSL heads 19 is shown in FIG. 11. The overall dimensions of this module 18, assuming a square cross section, is 12"×12"×48", although this is approximate since the size of the output beam is to be determined by analysis.

Figure 12:
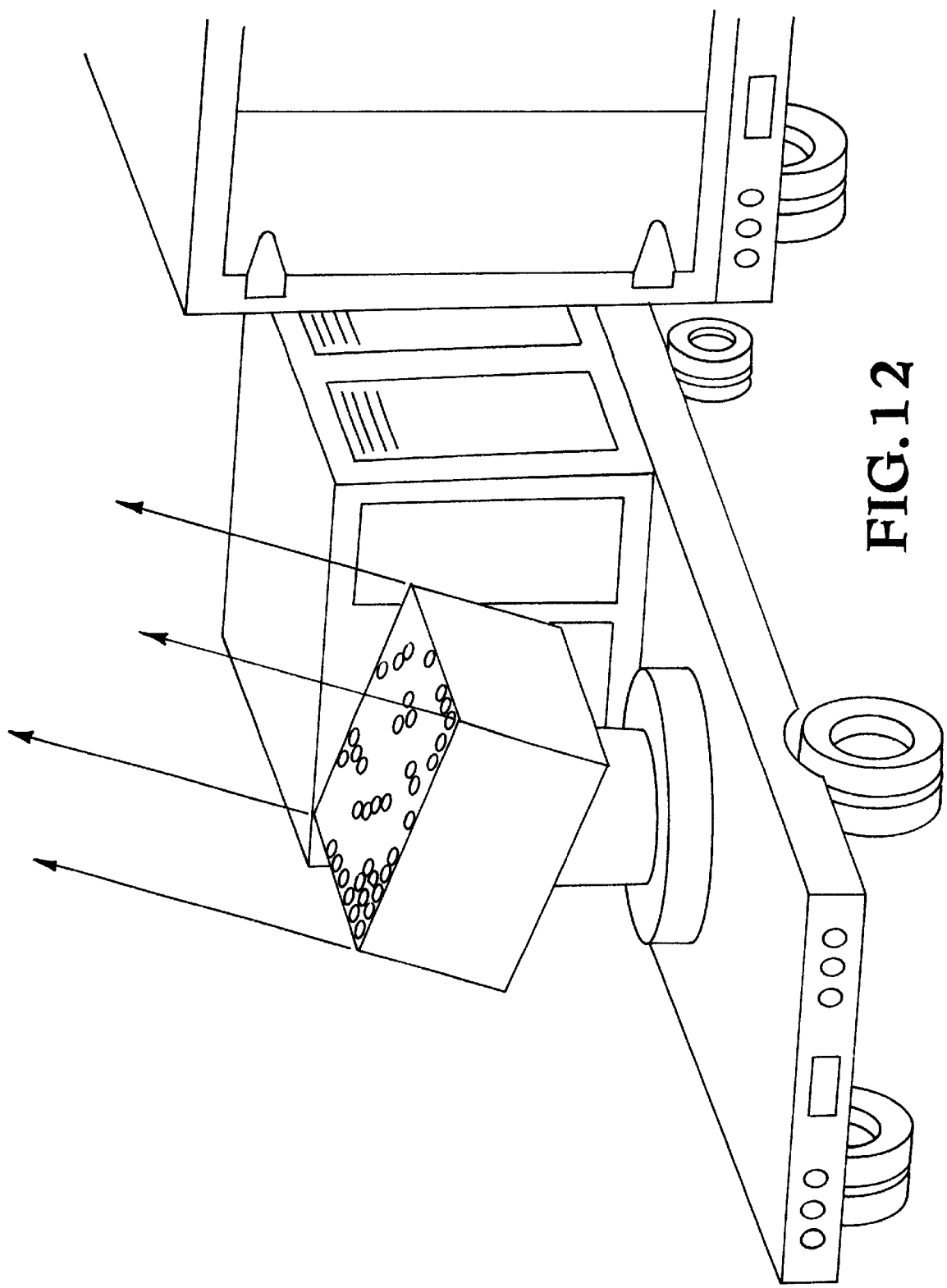
FIG. 12 shows a laser beam director and utility system mounted on a mobile platform.

The beam director 20 would be mounted on flatbed truck 21 or other suitable mobile platform as shown in FIG. 12. In this concept the laser beam director 20 and control system 22 would be mounted on one platform and the utilities on another. The utilities would include the power supply for the diodes and the cooling system. The final choice for the equipment is mounted on each platform is not final at this conceptual stage but issues such as vibration and noise isolation favor a separate platform for the power supply and cooling system.

There are several factors that influence exactly which design is used for the laser beam director. These factors include the stacking and construction of the laser modules, gimbal versus non-gimbal mounts, tracking slew rates, accuracy and precision requirements, beam shape at the target, and rotation of the target itself.

Figure 13:
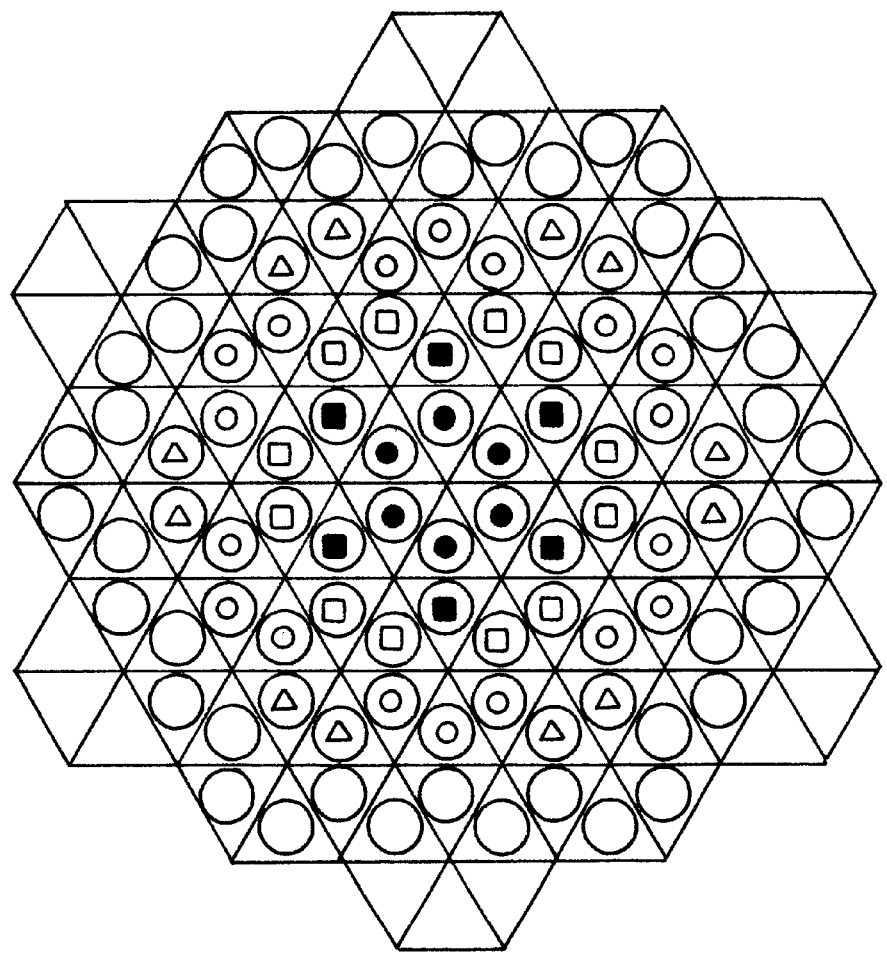
FIG. 13 shows a laser beam director configuration.

The shape 23 of the laser module itself is governed by strength and packing factors since stability of the laser pointing and minimization of the beam director size are very important. One example of a desirable laser module shape 23 which has excellent mechanical stability and low beam director dimensions is shown in FIG. 13.

A triangular cross section instead of a square has been chosen for increased mechanical stability in this example. The packing fraction gives 96 beams with a overall dimension of 2.8 m×2.4 m for a output beam diameter of 20 cm. This configuration of laser modules has an overall dimension which is slightly larger than the output beams by themselves but still smaller than the square configuration. The space between the round output beam and the triangle is sufficient for the utilities, e.g. power, cooling fluid, and diagnostics and control cables.

Figure 14:
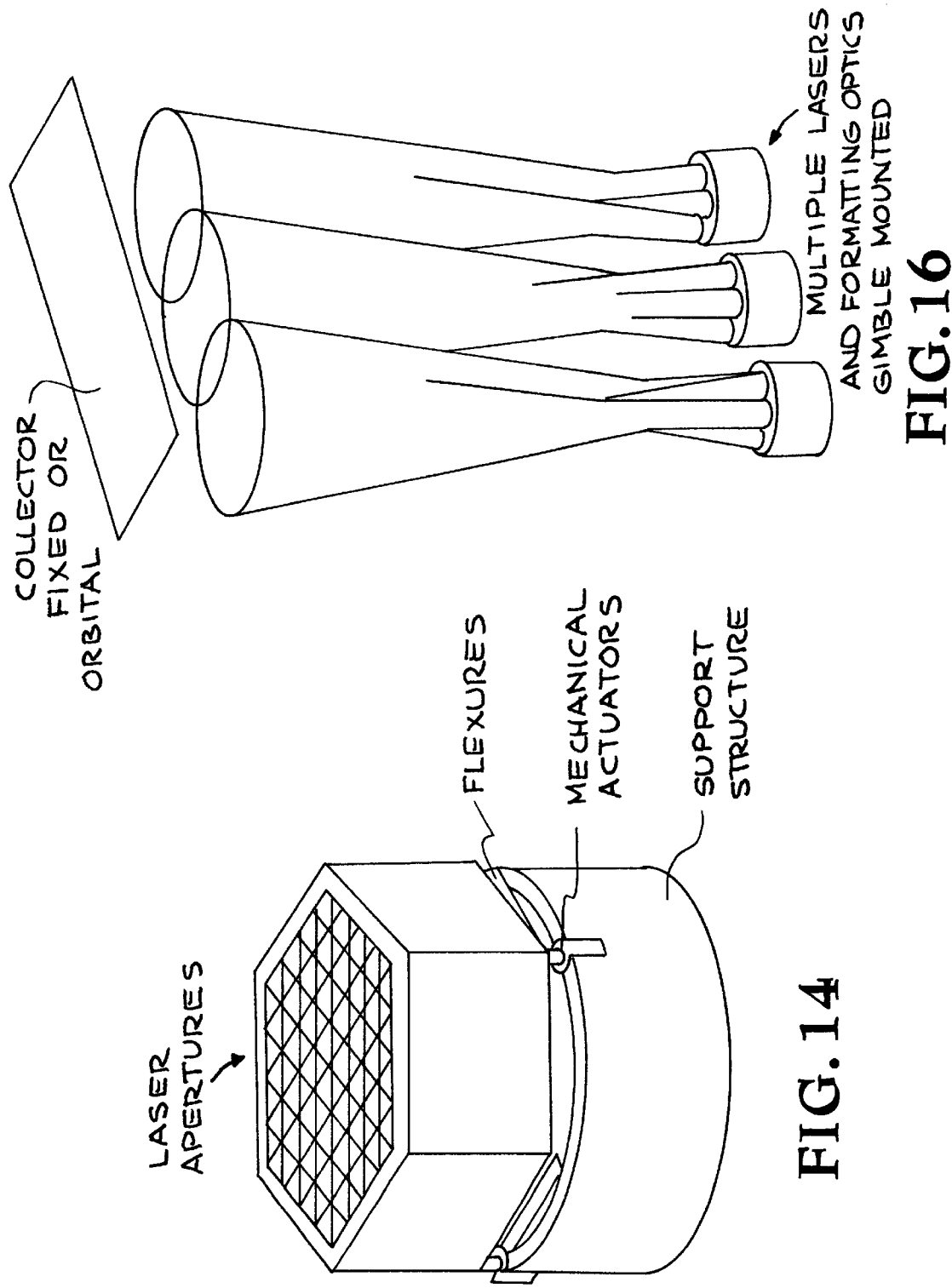
FIG. 14 shows a laser beam director with laser array mounted directly on the beam director.

One realization of the beam director subsystem is to mount the laser array directly on the beam director as shown in FIG. 14. Since the beam director does not have to move large amount to track the high altitude aircraft, a gimbal mount is not needed thereby saving cost. As shown in the figure a static mount, which can be pointed by separate means with a set of tip and tilt actuators sufficient to track the center of the wing's motion, is utilized.

Figure 15:
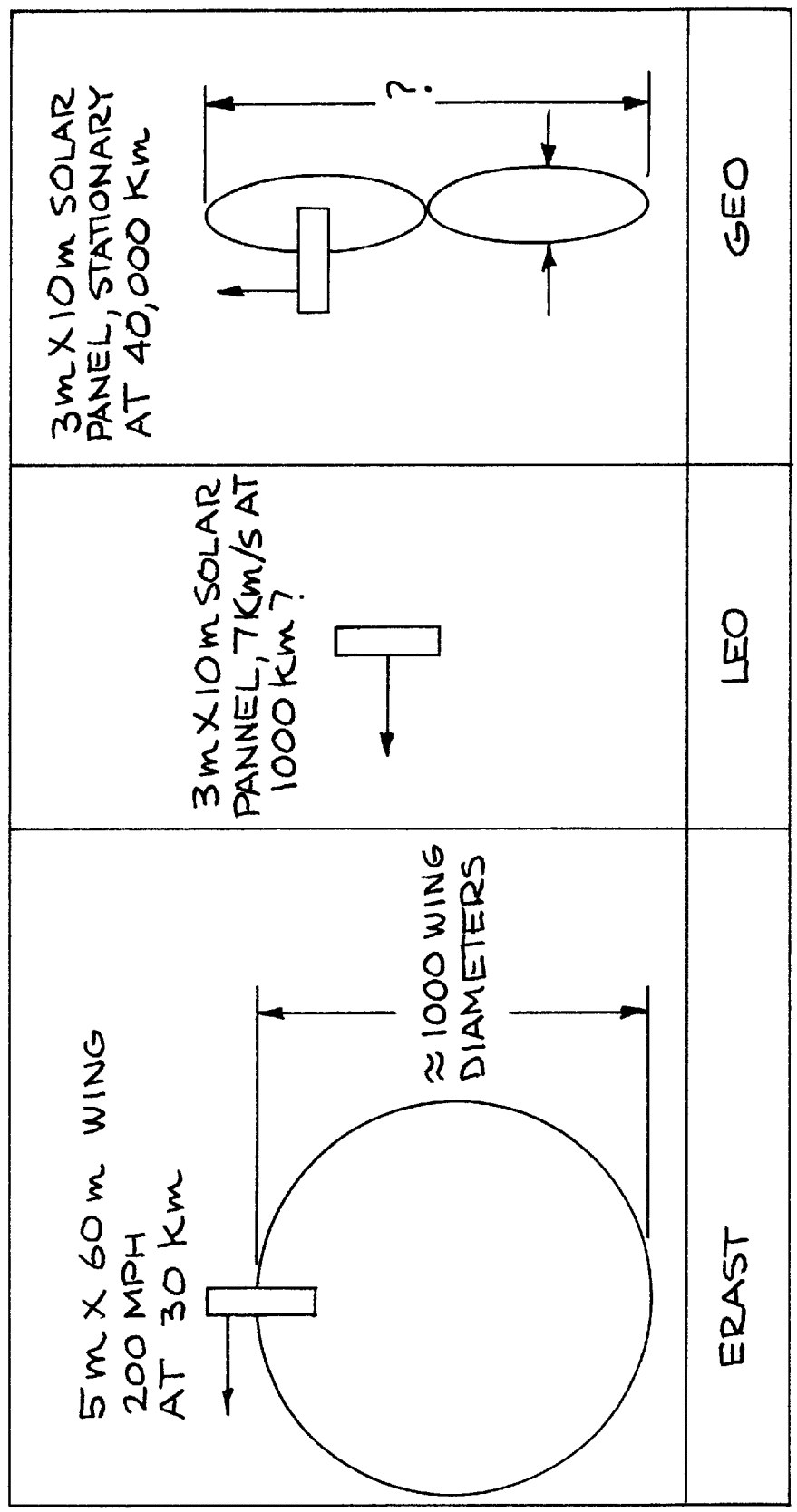
FIG. 15 shows the motion of the solar array pattern for various platform orbits.

The rectangular pattern of the solar array on the wing will rotate as the plane executes a circular "station keeping" pattern. The motion of the solar array is different from that of the Low Earth Orbit (LEO) or Geosynchronous Earth Orbit (GEO) satellites as shown in FIG. 15. For the laser illumination pattern shown in FIG. 9, not only must the center of the array follow the wing but the pattern must rotate too.

Figure 17:
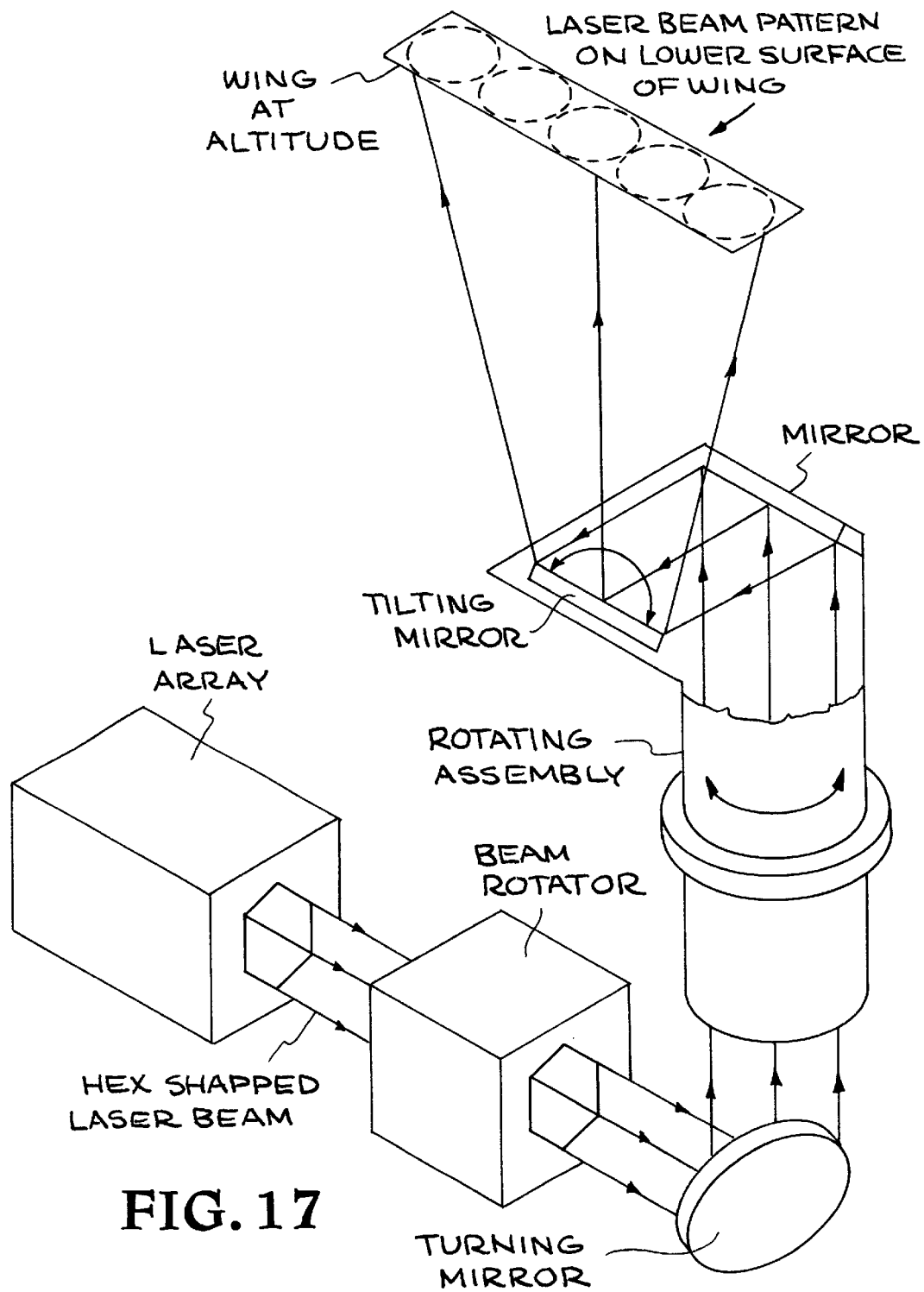
FIG. 17 illustrates a concept of fixed laser array, image rotator and coelestat.

One method of rotating the rectangular pattern is to dedicate a group of ten lasers in the array of FIG. 14 and have them track a point on the wing separately as the entire beam director follows the center of mass of the whole wing. Another method, depicted in FIG. 16 is to have separate beam directors each following a point on the wing. A third method, shown in FIG. 17, is to put the laser array 24 on the fixed platform and use a two flat mirror coelestat to point the beam at the wing. The laser array could then be pointed to be a rectangular footprint at the wing and still be a round beam bundle at the ground. A beam rotator 25, normally used in astronomy in the form of a "K" mirror would be synchronized to the aircraft's motion to rotate the rectangle.

The mechanical performance specifications on the beam director are derived from the aircraft's speed, altitude, and dimensions. The ERAST platform is designed to fly at 100,000 feet at a speed of approximately 20 mph giving a slew rate of about 1/4 mrad/sec which is only a factor of about three faster than earth's rotation. The aimpoint accuracy of the beam director is of the order of the wing chord or about 1/6 mrad. Compared to the diffraction limit of the individual laser beam with diameter of 20 cm, this accuracy corresponds to a factor of 30 larger and therefore relatively easy. The pointing precision should be a factor or at least 10 higher but even at a factor of 30, this is still only at the diffraction limit. Note that since the laser beam diameter is of the same order as $r_o$ the diffraction pointing limit is the same as the beam tilt given by the atmospheric turbulence so the specifications are consistent.

The acquisition and tracking of a high altitude aircraft, although far simpler than for high speed aircraft or satellites, is still non trivial. This is especially true when the low radar cross section resulting from lightweight composite material construction and the high altitude is considered. The aircraft is cooperative, and a simple transponder could be used in conjunction with a passive tracker can serve as a coarse acquisition system. In this case, a tracker would be a radar receiver with a quad cell detector at the focus such that the entire tracker can be moved to center the transponder signal. The coordinates of the tracker are then read out using an encoder and used to feed a fine scale tracking device which actually points the laser beam director. The tracker has an 8 foot receiving antenna and operates at the $\lambda$ band microwave frequency. An alternate to the tracker is a standard active radar, one with a 20 mile range. Either a return signal from the propeller motors or from a set of radar reflectors can serve to track the high altitude aircraft.

Once the coarse acquisition system acquires the high altitude aircraft, a narrow angle radar system, which is boresighted with the laser beam, maintains the laser beam on the wing. The present boresight radar has a 7° field of view and a range of 20 miles with an antenna consisting of a 12" phased array flat dish. After this coarse radar acquisition, a finer scale acquisition system consisting of a wide angle laser and a set of corner cube reflectors located on the edge of the platform would be used. This laser illumination will also be to view the platform with a standard 20 cm astronomical telescope fitted with an IR camera. The image is then used to select aimpoints for the individual lasers.

In order to optimize the laser beam on the wing, it is possible to make use of either of two technologies. One is a simple feedback loop which measures the current produced from the solar cell array and dithers the position of the laser beam to optimize the current. The other method is to install 4 corner cubes on the edges of the wing and use a simple amateur telescope equipped with an infrared camera to directly image the wing. Simple image processing can then assure that the optimum aimpoint of the laser is maintained.

With a laser system of the magnitude of the power beaming laser, eye safety will certainly be an issue and it will be imperative that an aircraft avoidance system be implemented. FAA coordination will absolutely be required.

There are three tiers in the safety system for aircraft avoidance. The first tier is a set of visual observers with telecommunications and shutter switches. They are trained to recognize the vectors and distance of approaching aircraft and can alert the laser operator to close the laser shutter. In case this communication is not effective, the visual observer can close the laser shutter manually.

The second tier is a wide angle radar system using a modified marine radar. Although this conical scan pattern leaves a hole around zenith, this radar does give long range data on approaching aircraft. Presently, this a manual radar and not automated into the laser safety system.

Another alternative is a radar mosaic feed compiled from FAA radars located close to the laser site. Commercial companies can supply hardware and software to compile the mosaic and deliver it to the laser safety system in the form of aircraft vectors, speed, altitude, etc. This system can easily be automated into the laser safety system and operate shutters to close the laser upon impending approach of an aircraft.

Figure 18:
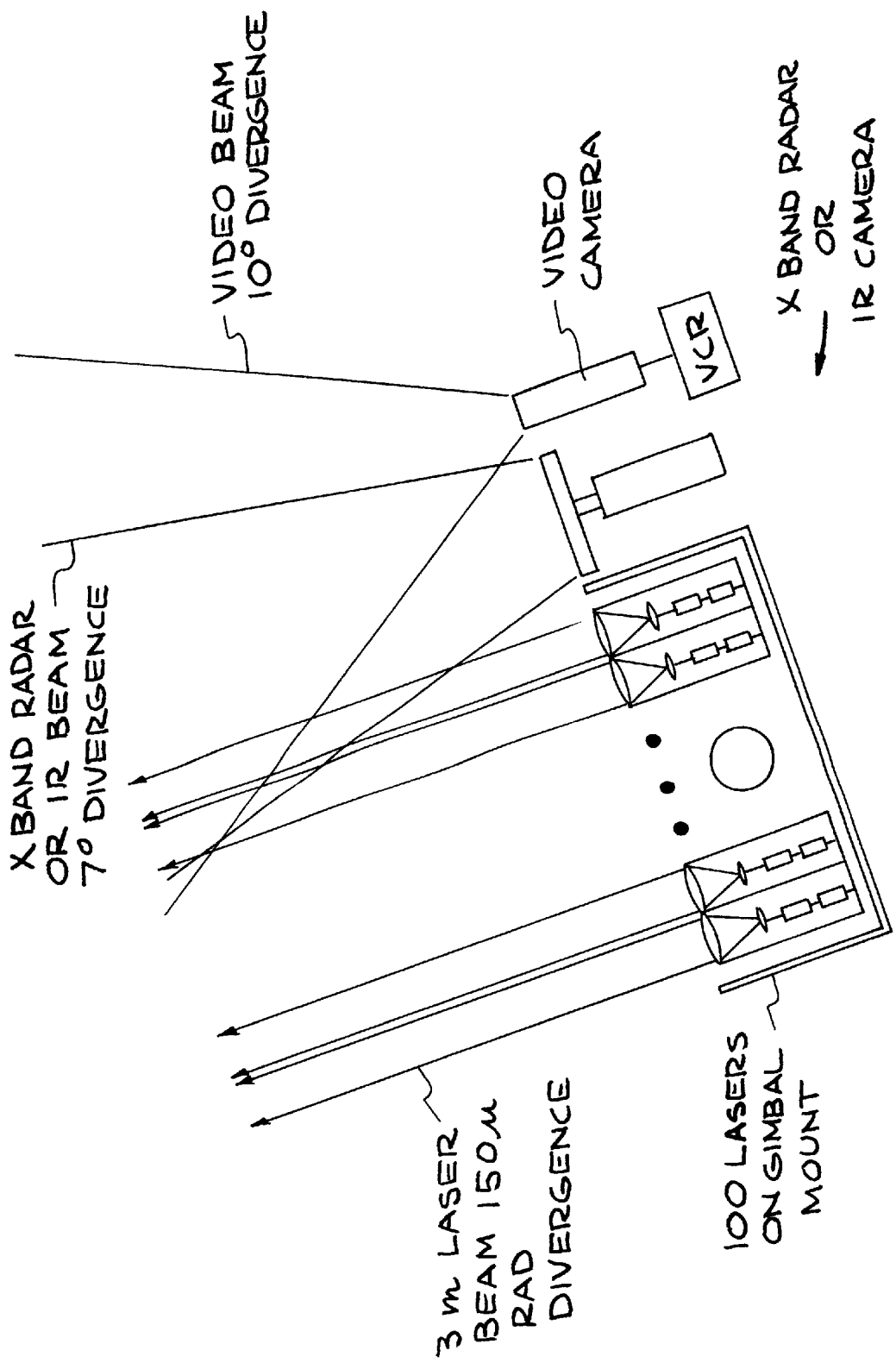
FIG. 18 illustrates an aircraft avoidance system.

The third tier of the aircraft avoidance system is a narrow angle radar similar to the one described for the acquisition radar. The aircraft avoidance system is shown in FIG. 18. This radar 26 is boresighted to the laser beam and automatically closes the laser shutter in case an aircraft is missed by either of the first two tiers of the safety system. The speed of the entire shutter system must be sufficiently fast so that the shutter is closed before the aircraft can pass from the radar beam edge to the center of the radar field of view where the laser beam is. Adjacent to the radar is a video camera 27 which is also boresighted to the laser beam.

The concept is to view the aircraft with the video camera 27 which is set up to have a slightly larger field of view than the narrow angle radar 26. The video image is saved on a VCR. Once the aircraft enters the radar field of view, the return signal closes the laser shutter and also triggers a small UV flash which appears as a white frame in the VCR for marking purposes. Beyond that point in time, the video monitors the aircraft's passage through its field of view and confirms that the laser beam is indeed been closed. This record provides proof of the effectiveness of the aircraft avoidance system, especially for insurance records.

At this power level, the laser beam may also either damage satellite sensors or temporally blind them, neither of which is acceptable. Therefore a satellite avoidance scheme will be necessary as well. Such a scheme will require close coordination with the US Space Command at Cheyenne Mt. A scheme has been developed in conjunction with the Laser Guide Star Project and can be used for Power Beaming as well. The scheme consists of communicating to US Space Command a predetermined laser plan including the coordinates and times of laser propagation. Space Command analyzes the laser propagation data for possible intercepts with known satellites and publishes a list of start and stop time which is communicated to the laser operator. The laser operator enters this information into a control computer which automatically closes the laser shutter at the appropriate times.

At the power levels proposed for the power beaming mission, the laser beam will definitely not be eye safe with regard to direct beam viewing, i.e. looking directly down the beam. As far as visibility of the beam is concerned, the 1.06 micron wavelength will probably not be visible during the night time hours and definitely not during the day time hours. Since no one has ever seen a beam of this power level in the atmosphere, it is not clear that the response of the human eye is sufficiently low at 1.06 microns so that it not be visible at all. For the green wavelength, the beam will certainly be visible day or night.

The aircraft avoidance system will take care of personnel in aircraft. For safety, people working on or near the laser platform will be required to wear protective goggles at the least and direct access to the laser beam director will be prohibited by fail safe barricades. Calculations indicate that it will not be dangerous to view the beam from the side even of a diffuse reflector such as white bird, flies into the beam. For the worst case of a 100 kW beam array, the power density in the beam is only a few watts per square centimeter which although is a factor of 1000 higher than the maximum permissible exposure, is still low by laser standards. For example, a laboratory HeNe laser at a milliwatt has a power density of only a factor of ten less than this power beaming array. Based upon scattering arguments, it is not expected that scattered light from the power beaming array will be harmful especially if a reasonable "keep out" distance of a few tens of meters is enforced.

The present invention provides a system for transmitting optical power between earth and a suspended structure in sufficient quantities to be useful for power electrical equipment for various uses. Additional aspects of the present invention will be obtained from analysis or the specification, claims, and drawings; and by practice of the invention. Changes and modifications in the specifically described embodiments can be carried out without departing from the scope of the invention, which is intended to be limited only by the scope of the claims.

What is claimed is:

1. A method of beaming power in sufficient quantities to be useful through a portion of the earth's atmosphere between earth and a platform at high altitude, comprising:
   providing a power transmitting system on either said earth or said platform that includes an array of individual lasers that produces a multiplicity of substantially parallel laser beams,
   providing a power receiving device on either said earth or said platform that includes a receiving system with a preselected spot size adapted to fit within a desired area and pattern, and
   transferring energy in sufficient quantities to be useful through said portion of the earth's atmosphere between said power transmitting system and said power receiving device by operating said array of individual lasers at laser wavelengths other than infrared and directing said multiplicity of substantially parallel laser beams onto said receiving system with a preselected spot size.

2. The method of claim 1 wherein said individual lasers are operated at laser wavelengths in the range 0.5 microns to 1.1 microns.

3. The method of claim 1 wherein said power receiving device includes at least one photovoltaic cell and said individual lasers are operated at a single range of laser wavelengths.

4. The method of claim 1 wherein said individual lasers are diode Nd:YAG pumped lasers with CPC pump geometry.

5. The method of claim 1 wherein said array of individual lasers are included in a beam director mounted on a mobile platform located on said earth.

6. The method of claim 1 wherein said platform is a solar airplane and said multiplicity of substantially parallel laser beams have a combined maximum size that will provide an arrival beam that will fit within said preselected spot size and said preselected spot size is located within an area on said solar airplane.

7. The method of claim 1 including using a radar system and a laser shutter system to automatic control said laser beams wherein the radar system produces a radar beam substantially aligned with said laser beams so that when an aircraft is detected at the outer edges of said radar beam, said laser shutter system is closed before the aircraft can intersect said laser beams which is in the middle of said radar beam.

8. A power beaming system for transferring power in sufficient quantities to be useful through a portion of the earth's atmosphere between earth and a high altitude platform, comprising:

a power transmitting system adapted to be located on either said earth or said platform that includes an array of individual lasers that produces a multiplicity of substantially parallel laser beams for transferring power in sufficient quantities to be useful through said portion of the earth's atmosphere, a power receiving device adapted to be located on either said earth or on said high altitude platform, and a receiver in said power receiving device, said receiver having a preselected spot size adapted to fit within a desired area and pattern for receiving said multiplicity of substantially parallel laser beams for transferring energy at laser wavelengths other than infrared through said portion of the earth's atmosphere between said earth and said high altitude platform.

9. The system of claim 8 wherein said individual lasers are operated at laser wavelengths in the range 0.5 microns to 1.1 microns.

10. The system of claim 8 wherein said power receiving device includes at least one photovoltaic cell and said individual lasers operate at a single range of laser wavelengths.

11. The system of claim 8 wherein said each of said individual lasers is a diode Nd:YAG pumped laser with CPC pump geometry.

12. The system of claim 8 wherein said individual lasers are included in a beam director mounted on a mobile platform located on said earth.

13. The system of claim 8 wherein said platform is a solar airplane and said array of individual lasers produces a combined beam with a maximum size that will provide an arrival beam that will fit within said preselected spot size located on said solar airplane.

14. The system of claim 8 including a laser shutter in each of said individual lasers for stopping the laser beam in each of said individual lasers and a radar system to automatic control said laser beam in each of said individual lasers wherein said radar system produces a radar beam substantially aligned with said laser beam in each of said individual lasers so that when an aircraft is detected at the outer edges of said radar beam, said laser shutter is closed before said aircraft can intersect said laser beam in each of said individual lasers which is in the middle of said radar beam.

15. A power beaming system for transferring power in sufficient quantities to be useful through a portion of the earth's atmosphere between earth and a remote platform at high altitude, comprising:

power transmitting means located on either said earth or said remote platform for transferring power in sufficient quantities to be useful, said power transmitting means including an array of individual lasers that produces a multiplicity of substantially parallel laser beams for transferring energy at laser wavelengths other than infrared through said portion of the earth's atmosphere between said earth and said remote platform, and power receiving means located on either said earth or on said remote platform for transferring energy through said portion of the earth's atmosphere between said earth and said remote platform in sufficient quantities to be useful, said power receiving means including a receiver having a preselected spot size adapted to fit within a desired area and pattern for receiving said multiplicity of substantially parallel laser beams for transferring energy at laser wavelengths other than infrared between said earth and said remote platform.

16. The system of claim 15 wherein said platform is a solar airplane and said power receiving means is located on said solar airplane and wherein each of said individual lasers produces a laser beam and the combined multiplicity of beams have an initial diameter that is of a sufficient size to provide an arrival multiplicity of beams that will fit said preselected spot size on said power receiving means located on said solar airplane.

* * * * *